(12) United States Patent
Nelson et al.

(10) Patent No.: US 11,649,883 B1
(45) Date of Patent: May 16, 2023

(54) CONNECTION INTERFACE FOR REACTION PLATE IN TORQUE CONVERTER

(71) Applicant: SCHAEFFLER TECHNOLOGIES AG & CO. KG, Herzogenaurach (DE)

(72) Inventors: Kyle Nelson, Wadsworth, OH (US); Victor Norwich, Wooster, OH (US); Kyle Royer, Wadsworth, OH (US); Brian Zaugg, Millersburg, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/713,730

(22) Filed: Apr. 5, 2022

(51) Int. Cl.
*F16H 45/02* (2006.01)

(52) U.S. Cl.
CPC ..... *F16H 45/02* (2013.01); *F16H 2045/0221* (2013.01)

(58) Field of Classification Search
CPC ............. F16H 45/02; F16H 2045/0221; F16H 2045/0278; F16H 2045/0273; F16H 2045/0294; F16H 41/24; F16H 2041/243; F16H 41/28
See application file for complete search history.

(56) References Cited

U.S. PATENT DOCUMENTS

| 6,688,441 | B1* | 2/2004 | Arhab | F16H 45/02 |
| | | | | 192/3.29 |
| 10,941,844 | B2 | 3/2021 | Nelson et al. | |
| 2009/0152067 | A1* | 6/2009 | Cmich | F16H 45/02 |
| | | | | 192/3.29 |
| 2016/0116037 | A1* | 4/2016 | Depraete | F16H 45/02 |
| | | | | 29/889.5 |
| 2018/0100550 | A1* | 4/2018 | Horen | F16D 13/70 |

* cited by examiner

*Primary Examiner* — Richard W Ridley
*Assistant Examiner* — Aimee Tran Nguyen
(74) *Attorney, Agent, or Firm* — Volpe Koenig, P.C.

(57) ABSTRACT

A torque converter assembly is disclosed herein. The assembly can include a torque converter cover having a first axially extending flange, a reaction plate having a second axially extending flange, and a torque converter pump having a third axially extending flange. The first axially extending flange, the second axially extending flange, and the third axially extending flange are connected to each other via a single connection. In one aspect, the single connection comprises a weld.

18 Claims, 5 Drawing Sheets

CONNECTION INTERFACE FOR REACTION PLATE IN TORQUE CONVERTER

FIELD OF INVENTION

The present disclosure relates to a torque converter assembly, and is more particularly related to a connection interface between a reaction plate and other components in a torque converter assembly.

BACKGROUND

Torque converter assemblies are well known. Within these assemblies, it is generally known that a connection is required between a reaction plate of a clutch pack or assembly and a torque converter cover. Additionally, it is required to provide a connection between the torque converter cover and a torque converter pump, which is also known as a closure connection or weld. One known solution for providing these connections is to connect the reaction plate with the torque converter cover, and also provide a closure weld between the torque converter cover and the torque converter pump. The labor, tooling, and assembly steps involved with these connections can be expensive and time consuming.

It would be desirable to provide an improved connection arrangement between the relevant components in a torque converter assembly that is more cost-effective.

SUMMARY

A torque converter assembly having a modified connection interface between a reaction plate and adjacent components is disclosed herein. The assembly includes a torque converter cover having a first axially extending flange, a reaction plate having a second axially extending flange, and a torque converter pump having a third axially extending flange. The first axially extending flange, the second axially extending flange, and the third axially extending flange are connected to each other via a single connection. In one aspect, the single connection comprises a weld, which directly contacts the torque converter cover, the reaction plate, and the torque converter pump.

The second axially extending flange is arranged radially inside of the first axially extending flange and the third axially extending flange, in one aspect.

The first axially extending flange and the third axially extending flange can be arranged co-planar in an axial direction.

The single connection can be provided between respective terminal ends of the first axially extending flange and the third axially extending flange.

In one aspect, the single connection is provided away from a terminal end of the second axially extending flange.

The first axially extending flange can include a shoulder configured to receive a portion of the second axially extending flange and provide a press-fit connection with the reaction plate.

The single connection can be provided between respective terminal ends of the first axially extending flange and the second axially extending flange. A terminal end of the third axially extending flange can be arranged radially inward from the terminal end of the second axially extending flange.

The first axially extending flange, the second axially extending flange, and the third axially extending flange can be configured to be stacked on top of each other in a radial direction. This stack can provide direct contact between adjacent components.

In another aspect, a method of assembling a torque converter assembly is also disclosed herein. The method includes providing: a torque converter cover including a first axially extending flange; a reaction plate including a second axially extending flange; and a torque converter pump including a third axially extending flange. The method can include inserting the second axially extending flange inside of the first axially extending flange, and a press-fit connection can be defined between the second axially extending flange and the first axially extending flange, such that the reaction plate can be temporarily held in place relative to the torque converter cover during assembly. The method includes positioning the torque converter pump relative to the torque converter cover and the reaction plate such that the first axially extending flange, the second axially extending flange, and the third axially extending flange are adjacent to each other. The method includes connecting the first axially extending flange, the second axially extending flange, and the third axially extending flange with each other to join the torque converter cover, the reaction plate, and the torque converter pump via a single connection.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1A:
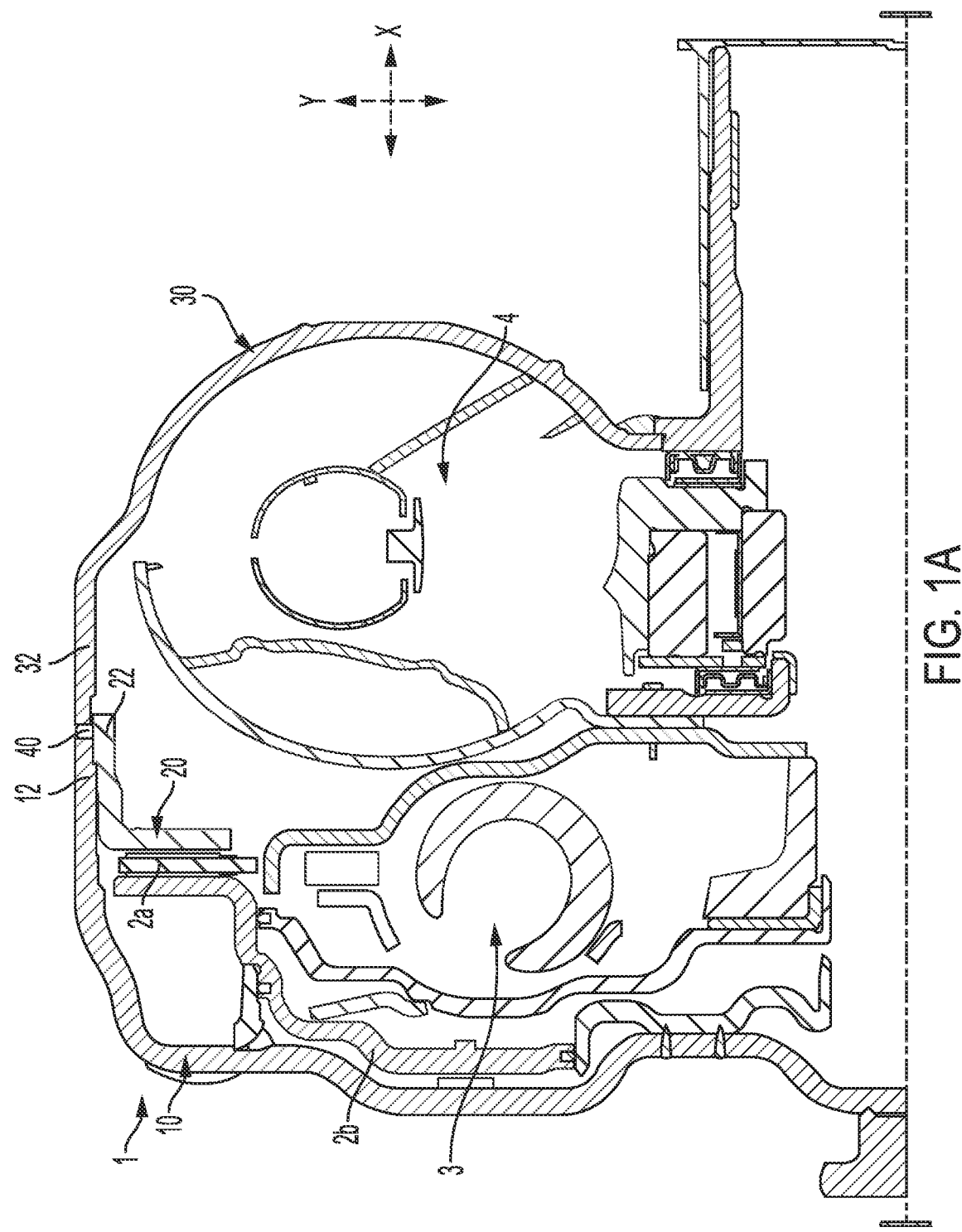
FIG. 1A is a cross-sectional view of a torque converter assembly according to a first aspect.

Certain terminology is used in the following description for convenience only and is not limiting. "Axially" refers to a direction along an axis (X) of an assembly, as shown in FIG. 1A. "Radially" refers to a direction inward and outward from the axis (X) of the assembly, i.e. in the "Y" direction as shown in FIG. 1A.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIGS. 1A, 1B, 2A, 2B, and 3, a torque converter assembly 1, 101, 201 is disclosed herein. The torque converter assembly 1, 101, 201 includes a torque converter cover 10, 110, 210 having a first axially extending flange 12, 112, 212. A reaction plate 20, 120, 220 is provided that includes a second axially extending flange 22, 122, 222. A torque converter pump 30, 130, 230 is also provided that includes a third axially extending flange 32, 132, 232.

Figure 3:
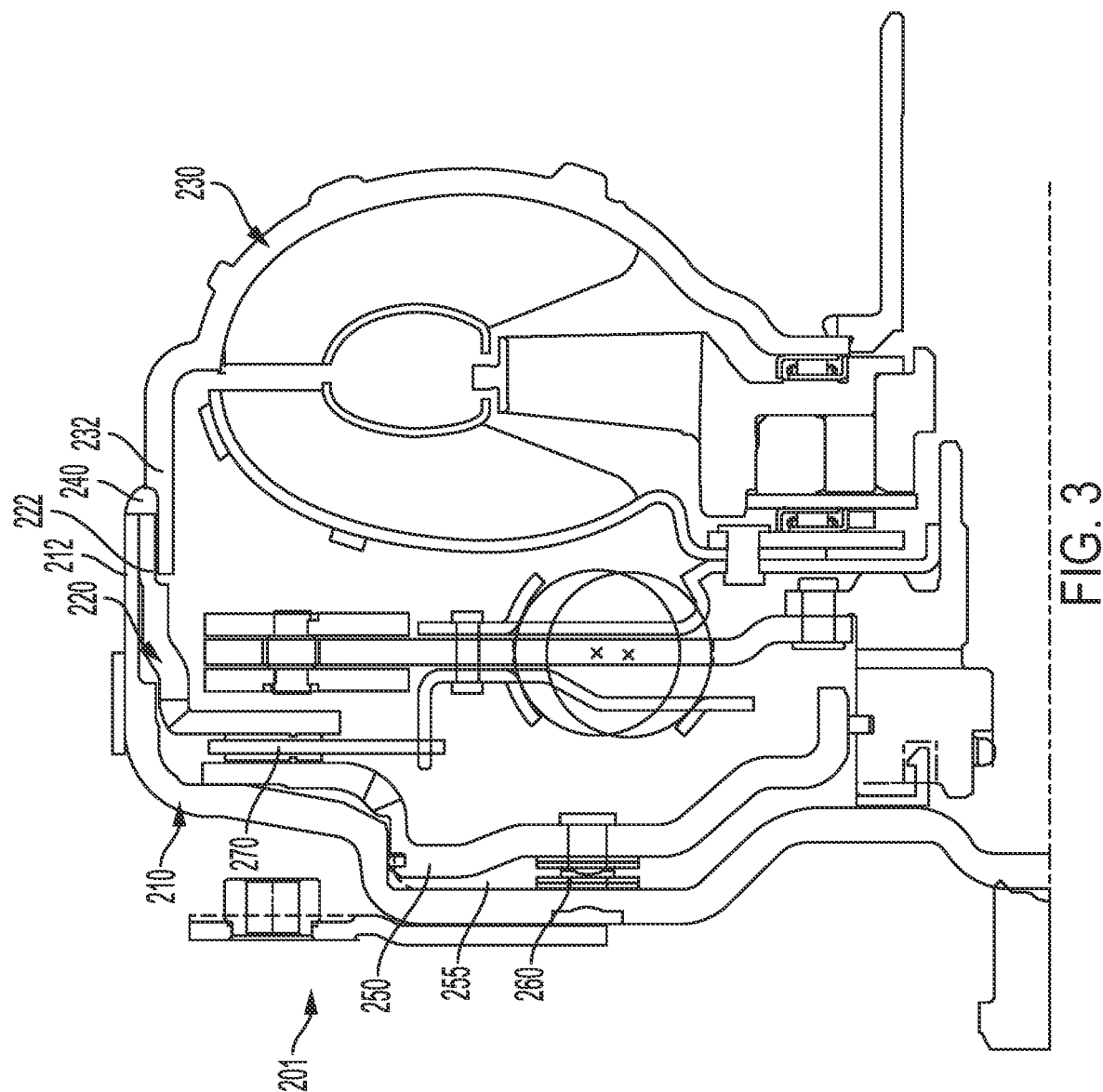
FIG. 3 is a cross-sectional view of a torque converter assembly according to a third aspect.

With respect to FIG. 3, the torque converter cover 210 is non-rotatably connected to the engine and is configured to transmit the engine rotation and torque from the engine into the torque converter assembly 201. A torque converter piston 250 can be non-rotatably connected to the cover 210 via a leaf spring/rivet connection 260. This leaf spring/rivet connection 260 is configured to allow for motion in an axial direction (i.e. along the X-axis, but not the Y-axis or Z-axis). The reaction plate 220 can be fixed to the torque converter cover 210 via a single connection 240, such as a weld, as described in more detail herein. These components rotate at same speed as they are all effectively fixed to one another, with the exception of the piston 250 which can travel in the axial direction (i.e. the X-direction). When a piston apply chamber 255 is pressurized, this pressure then moves piston 250 in the axial direction (i.e. the +X direction), clamping the clutch plate 270 between the piston 250 and reaction plate 220. The clutch plate 270 then becomes locked via friction to these components, transferring torque into the torque converter damper during lockup. During an unlocked mode, torque is transferred from the torque converter cover 210 through the connection 240 into the pump 230.

Additional components are also illustrated in the drawings. For example, as shown in FIG. 1A, a clutch plate 2a is provided that is configured to engage with the reaction plate, as well as a piston plate 2b that is configured to engage with the clutch plate 2a. A torsional damper assembly 3 can be provided. Additionally, an impeller-turbine configuration 4 can be provided inside of the torque converter pump. Various other components, include pistons, plates, seals, bearings, and other elements can be provided within the torque converter assembly 1, 101.

Generally, a single connection is provided that joins the torque converter cover 10, 110, 210, the reaction plate 20, 120, 220, and the torque converter pump 30, 130, 230. In one aspect, the first axially extending flange 12, 112, 212, the second axially extending flange 22, 122, 222, and the third axially extending flange 32, 132, 232 are connected to each other via a single connection 40, 140, 240. A single connection could be provided in regions of these three components that do not include the axially extending flanges.

In one aspect, the single connection 40, 140, 240 comprises a welding connection. In one aspect, the welding connection does not include laser welding. The single connection can be provided in a circumferential direction around an entire perimeter or periphery of the assembly. Welding is one known connection type for this arrangement which is suitable and reliable, as the torque converter needs to be a pressure vessel, and hold fluid to a set pressure and speed. One of ordinary skill in the art would understand that other connections, such as bolts or fasteners can be used. One of ordinary skill in the art would understand that various types of welding could be used, such as laser, TIG, MIG, etc., as long as the resulting welded connection meets the pressure vessel requirements.

As used herein, the term connection refers to a fastening, connecting, or joining element that rigidly attaches or secures the torque converter cover 10, 110, 210, the reaction plate 20, 120, 220, and the torque converter pump 30, 130, 230 with each other. The connection can be provided in a variety of ways, including welding, fitted connections, fasteners, or other configurations that reliably secure components with each other.

Figure 1B:
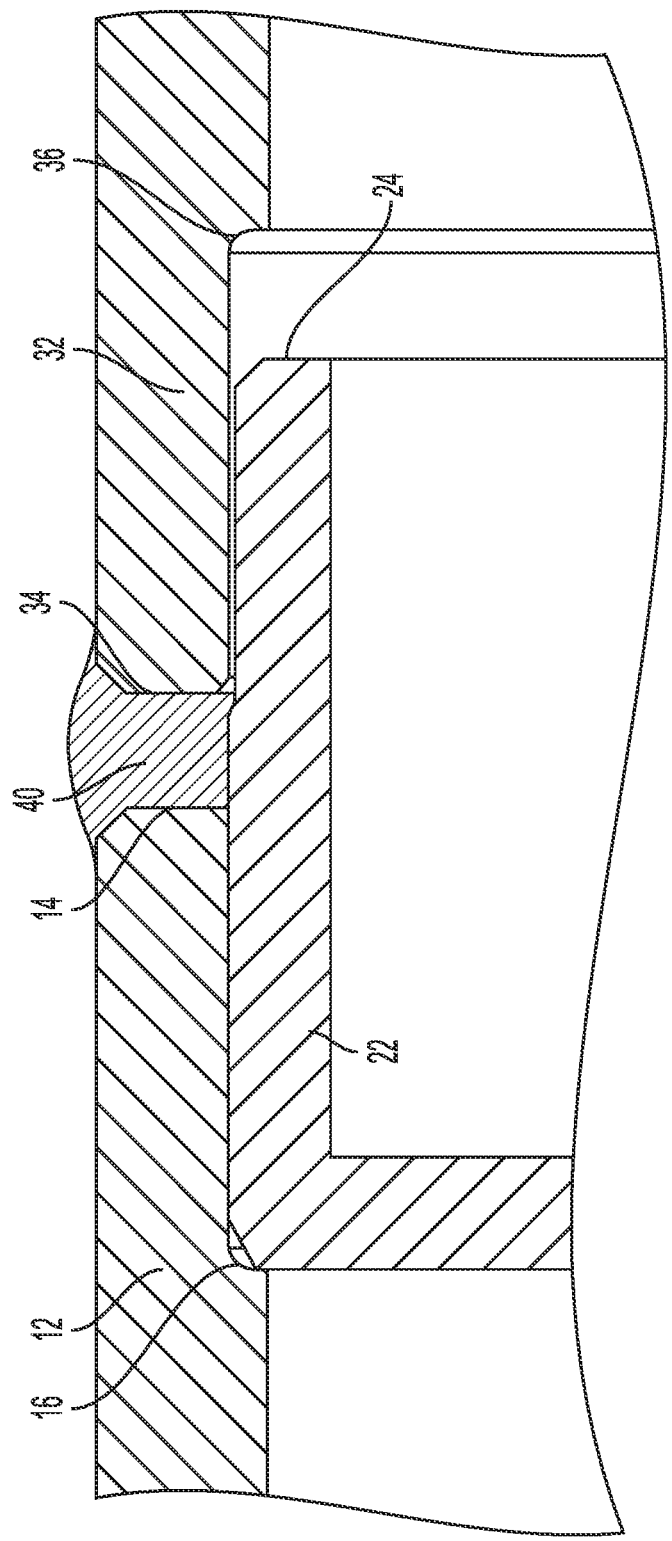
FIG. 1B is a magnified cross-sectional view of a connection area of the torque converter assembly of FIG. 1A.

As shown in FIGS. 1A and 1B, the second axially extending flange 22 can be arranged directly radially inside of both the first axially extending flange 12 and the third axially extending flange 32. The first axially extending flange 12 and the third axially extending flange 32 can also be arranged to be co-planar in an axial direction, as best shown in FIG. 1B.

As shown in FIG. 1B, the single connection 40 can be provided between respective terminal ends 14, 34 of the first axially extending flange 12 and the third axially extending flange 32. In one aspect, the single connection 40 is provided away from a terminal end 24 of the second axially extending flange 22.

Figure 2A:
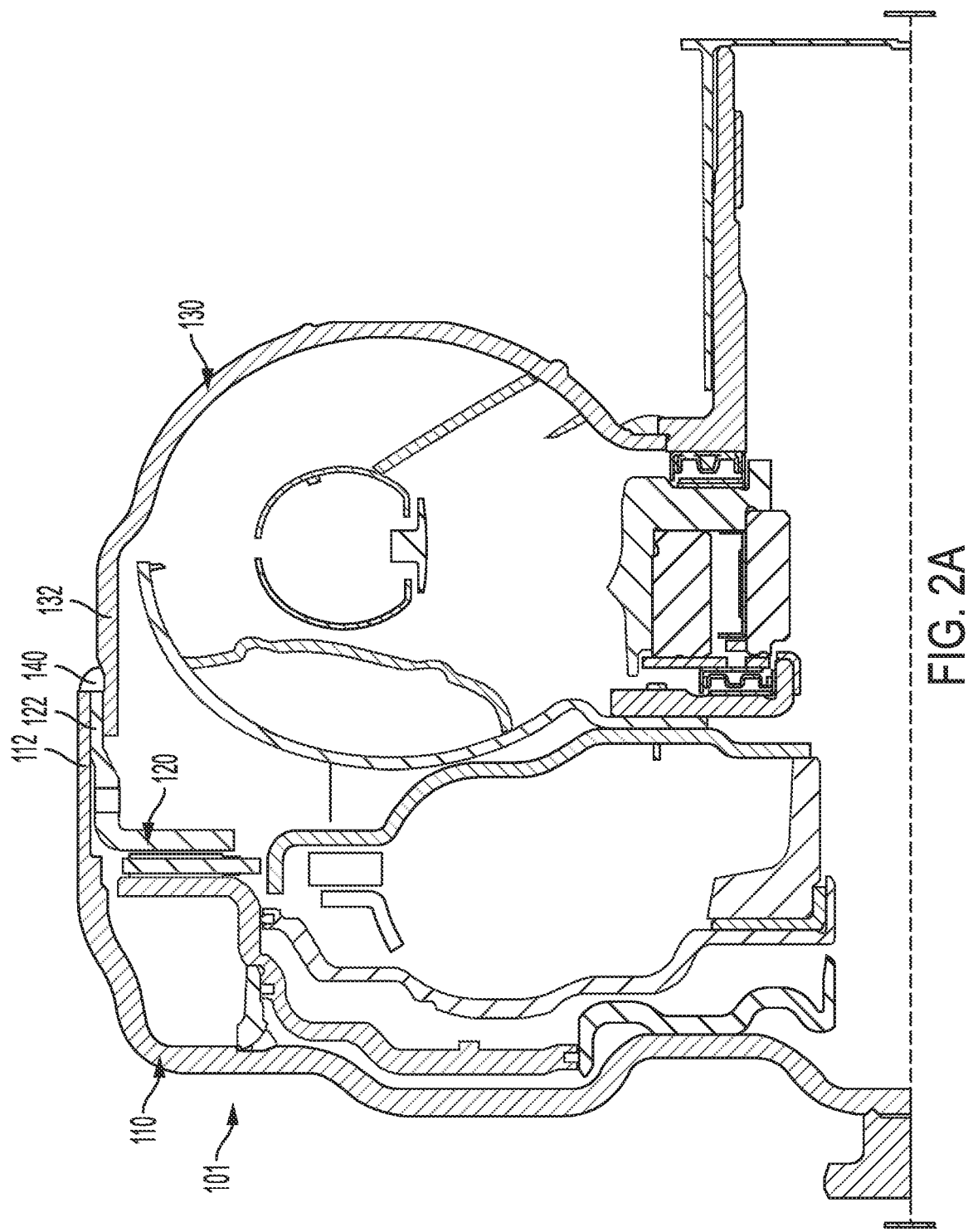
FIG. 2A is a cross-sectional view of a torque converter assembly according to a second aspect.
Figure 2B:
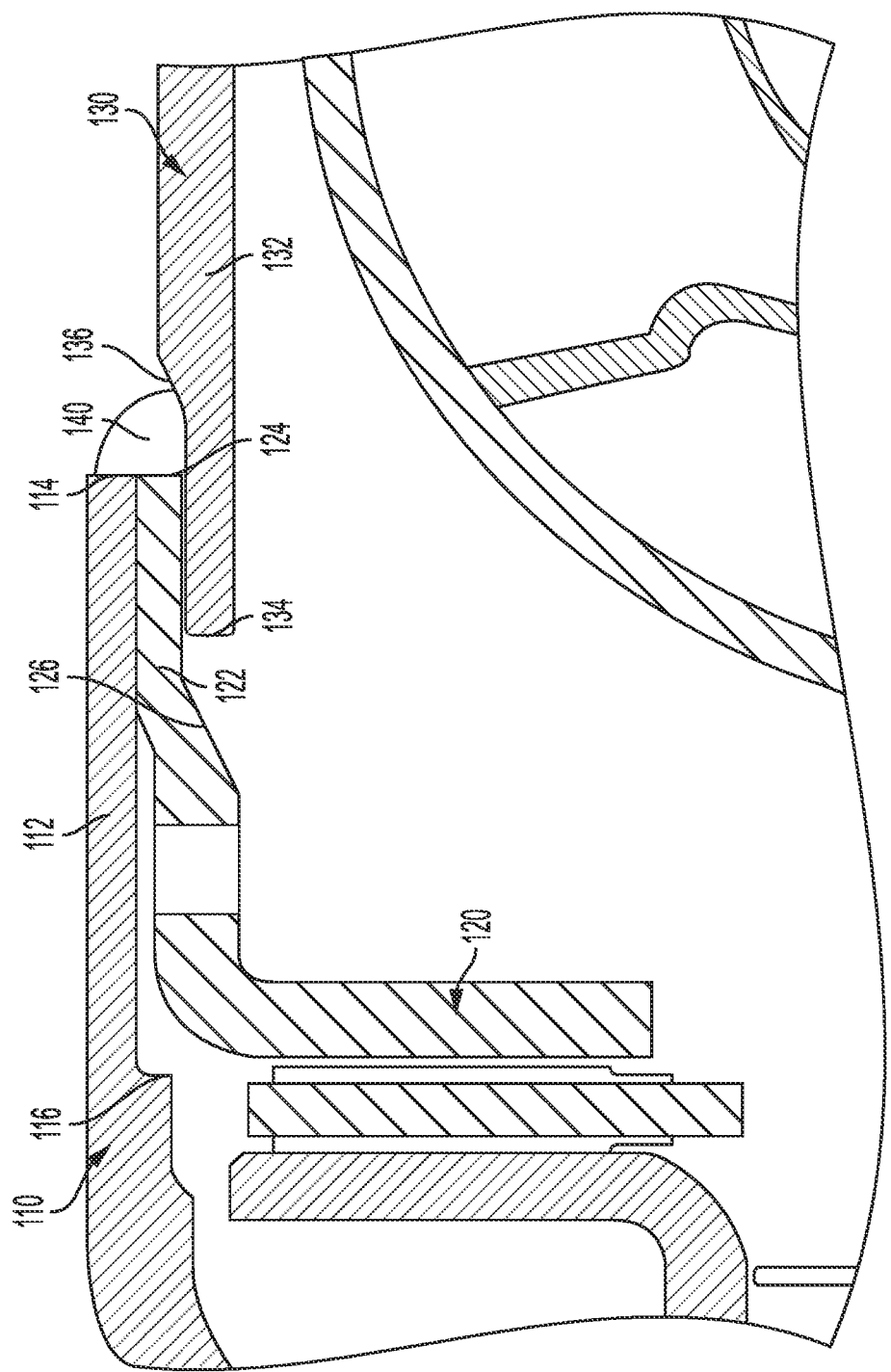
FIG. 2B is a magnified cross-sectional view of a connection area of the torque converter assembly of FIG. 2A.

As shown in FIG. 2B, the first axially extending flange 112, the second axially extending flange 122, and the third axially extending flange 132 can be stacked on top of each other in a radial direction. In one aspect, a single radial plane can intersect the first axially extending flange 112, the second axially extending flange 122, and the third axially extending flange 132.

In one aspect, the terminal end 134 of the third axially extending flange 132 can have a reduced outer diameter, as shown in FIG. 2B. The reduction in thickness of the third axially extending flange 132 can provide an improved interface that is configured to receive at least a portion of the second axially extending flange 122.

The single connection 140 can be provided between respective terminal ends 114, 124 of the first axially extending flange 112 and the second axially extending flange 122, as best shown in FIG. 2B. A terminal end 134 of the third axially extending flange 132 can be arranged radially inward from the terminal end 124 of the second axially extending flange 122.

As shown in FIG. 1B, the first axially extending flange 12 can comprise a shoulder 16 configured to receive a portion of the second axially extending flange 22 and provide a press-fit connection. The shoulder 16 can be defined on a radially inner surface of the first axially extending flange 12.

As shown in FIG. 2B, the second axially extending flange 122 can project radially outwardly and can be configured to have a press-fit connection with the first axially extending flange 112. One of ordinary skill in the art would understand that other configurations and geometries for either the first axially extending flange 12, 112, 212 or the second axially extending flange 22, 122, 222 can be provided that also provide a press-fit connection. These connections allow for the reaction plate 20, 120, 220 to be temporarily held in place due to the press-fit connection, which simplifies assembly and manufacturing. Additionally, by providing a press-fit connection between the reaction plate 20, 120, 220 and the torque converter cover 10, 110, 210, a clutch lift-off can also be set and/or controlled. In one aspect, the clutch lift-off can be set to approximately 1.0 mm.

As best shown in FIG. 1B, in one aspect, the first and third axially extending flanges 12, 32 are aligned with each other in an axial direction such that the two flanges 12, 32 may axially abut each other during assembly. The first axially extending flange 12 provides the shoulder 16 such that the reaction plate 20 can be inserted in an axial direction to a limited extent relative to the torque converter cover 10. The third axially extending flange 32 can likewise include a shoulder 36 that can also define an axial stop or abutment for the second axially extending flange 22.

As best shown in FIG. 2B, the third axially extending flange 132 can include a shoulder 136 configured to define an area for accommodating the connection 140. Likewise, the second axially extending flange 122 can include a shoulder 126 configured to define an axial end or stop for the terminal end 134 of the third axially extending flange 132. A shoulder 116 can also be defined on the first axially extending flange 112 that is configured to accommodate or receive a portion of the second axially extending flange 122 and also define an axial stop or abutment surface. Terminal ends 114, 124 of the torque converter cover 110 and the reaction plate 120 can be aligned with each other and co-planar in a radial direction, as best shown in FIG. 2B.

Any of the various shoulders disclosed herein can be formed as a change (i.e. reduction) in the thickness of any one or more of the axially extending flanges. These shoulders can help control the amount of connection between the three main components, or may be used to define axial abutments that aid in assembling the components with each other.

Aspects of the torsional damper assembly and the piston plate are modified in FIG. 3 relative to FIGS. 2A and 2B. FIG. 3 illustrates a torque converter cover 210 with a first axially extending flange 212, a reaction plate 220 with a second axially extending flange 222, a torque converter pump 230 with a third axially extending flange 232, and a connection 240 joining these three components. FIG. 3 discloses many similar features as FIGS. 2A and 2B and is not described in further detail herein.

In each of the embodiments disclosed herein, fitment of the torque converter pump relative to the reaction plate is configured to have a predetermined clearance, which allows for positioning of the pump hub to a pilot. In one aspect, a predetermined clearance is required so that in open mode (i.e. clutch unlocked) there is not excessive parasitic drag in the system. The gap defined is selected such that it is not too small to potentially create excessive drag, but not too large to require a significant volume of fluid needing to be displaced to engage the clutch.

A method of assembling a torque converter assembly is also disclosed herein. The method includes providing: a torque converter cover 10, 110, 210 including a first axially extending flange 12, 112, 212; a reaction plate 20, 120, 220 including a second axially extending flange 22, 122, 222; and a torque converter pump 30, 130, 230 including a third axially extending flange 32, 132, 232. The method includes inserting the second axially extending flange 22, 122, 222 inside of the first axially extending flange 12, 112, 212. A press-fit connection is defined between the second axially extending flange 22, 122, 222 and the first axially extending flange 12, 112, 212 such that the reaction plate 20, 120, 220 is temporarily held in place during the following steps. The method includes positioning the torque converter pump 30, 130, 230 relative to the torque converter cover 10, 110, 210 and the reaction plate 20, 120, 220 such that the first axially extending flange 12, 112, 212, the second axially extending flange 22, 122, 222, and the third axially extending flange 32, 132, 232 are adjacent to each other. In one aspect, the flanges can be stacked relative to each other. In another aspect, two of the flanges can be facing each other in an axial direction, while another one of the flanges can be arranged radially inside the other flanges. The method includes welding the first axially extending flange 12, 112, 212, the second axially extending flange 22, 122, 222, and the third axially extending flange 32, 132, 232 to join the torque converter cover 10, 110, 210, the reaction plate 20, 120, 220, and the torque converter pump 30, 130, 230 with each other with a single connection 40, 140, 240. Additional steps could be included for assembling a torque converter assembly.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS torque converter assembly 1, 101, 201
clutch plate 2a
piston plate 2b
torsional damper assembly 3
impeller-turbine configuration 4
torque converter cover 10, 110, 210
first axially extending flange 12, 112, 212
terminal end 14, 114 of first axially extending flange
shoulder 16, 116
reaction plate 20, 120, 220
second axially extending flange 22, 122, 222
terminal end 24, 124 of second axially extending flange
shoulder 126
torque converter pump 30, 130, 230
third axially extending flange 32, 132, 232
terminal end 34, 134 of third axially extending flange
shoulder 36, 136
connection 40, 140, 240
torque converter piston 250
piston apply chamber 255
leaf spring/rivet connection 260
clutch plate 270

What is claimed is:

1. A torque converter assembly comprising:
   a torque converter cover including a first axially extending flange;
   a reaction plate including a second axially extending flange; and
   a torque converter pump including a third axially extending flange;
   wherein the first axially extending flange, the second axially extending flange, and the third axially extending flange are connected to each other via a single connection provided between respective terminal ends of the first axially extending flange and the third axially extending flange; and
   wherein the single connection directly contacts both respective terminal ends of the first axially extending flange and the third axially extending flange, and a surface of the second axially extending flange;
   wherein the first axially extending flange includes a shoulder configured to receive a portion of the second axially extending flange and provide a stop for press fit connection with the reaction plate.

2. The torque converter assembly according to claim 1, wherein the single connection comprises a weld.

3. The torque converter assembly according to claim 2, wherein the weld directly contacts the torque converter cover, the reaction plate, and the torque converter pump.

4. The torque converter assembly according to claim 1, wherein the second axially extending flange is arranged radially inside of the first axially extending flange and the third axially extending flange.

5. The torque converter assembly according to claim 1, wherein the first axially extending flange and the third axially extending flange are co-planar in an axial direction.

6. The torque converter assembly according to claim 1, wherein the single connection is provided away from a terminal end of the second axially extending flange.

7. A method of assembling a torque converter assembly, the method comprising:
providing:
   a torque converter cover including a first axially extending flange;
   a reaction plate including a second axially extending flange; and
   a torque converter pump including a third axially extending flange;
inserting the second axially extending flange inside of the first axially extending flange and the third axially extending flange, wherein a press-fit connection is defined between the second axially extending flange and the first axially extending flange;
positioning the torque converter pump relative to the torque converter cover and the reaction plate such that the first axially extending flange, the second axially extending flange, and the third axially extending flange are adjacent to each other; and
connecting the first axially extending flange, the second axially extending flange, and the third axially extending flange to join the torque converter cover, the reaction plate, and the torque converter pump with each other via a single connection.

8. The method according to claim 7, wherein the single connection comprises a weld.

9. The method according to claim 8, wherein the weld directly contacts the torque converter cover, the reaction plate, and the torque converter pump.

10. The method according to claim 7, wherein the second axially extending flange is arranged radially inside of the first axially extending flange and the third axially extending flange.

11. The method according to claim 7, wherein the first axially extending flange and the third axially extending flange are co-planar in an axial direction.

12. The method according to claim 7, wherein the single connection is provided between respective terminal ends of the first axially extending flange and the third axially extending flange.

13. A torque converter assembly comprising:
   a torque converter cover including a first axially extending flange;
   a reaction plate including a second axially extending flange; and
   a torque converter pump including a third axially extending flange;
   wherein the first axially extending flange, the second axially extending flange, and the third axially extending flange are connected to each other via a single connection; and
   wherein respective terminal ends of the torque converter cover and the reaction plate are aligned with each other and are co-planar in a radial direction.

14. The torque converter assembly according to claim 13, wherein the single connection is provided between respective terminal ends of the first axially extending flange and the second axially extending flange.

15. The torque converter assembly according to claim 14, wherein a terminal end of the third axially extending flange is arranged radially inward from the terminal end of the second axially extending flange.

16. The torque converter assembly according to claim 13, wherein the first axially extending flange, the second axially extending flange, and the third axially extending flange are stacked on top of each other in a radial direction.

17. The torque converter assembly according to claim 13, wherein the single connection comprises a weld.

18. The torque converter assembly according to claim 17, wherein the weld directly contacts the torque converter cover, the reaction plate, and the torque converter pump.

* * * * *